Aug. 12, 1924.
E. E. WHITING
1,505,000
FILM OR PLATE HOLDER
Filed May 13, 1922
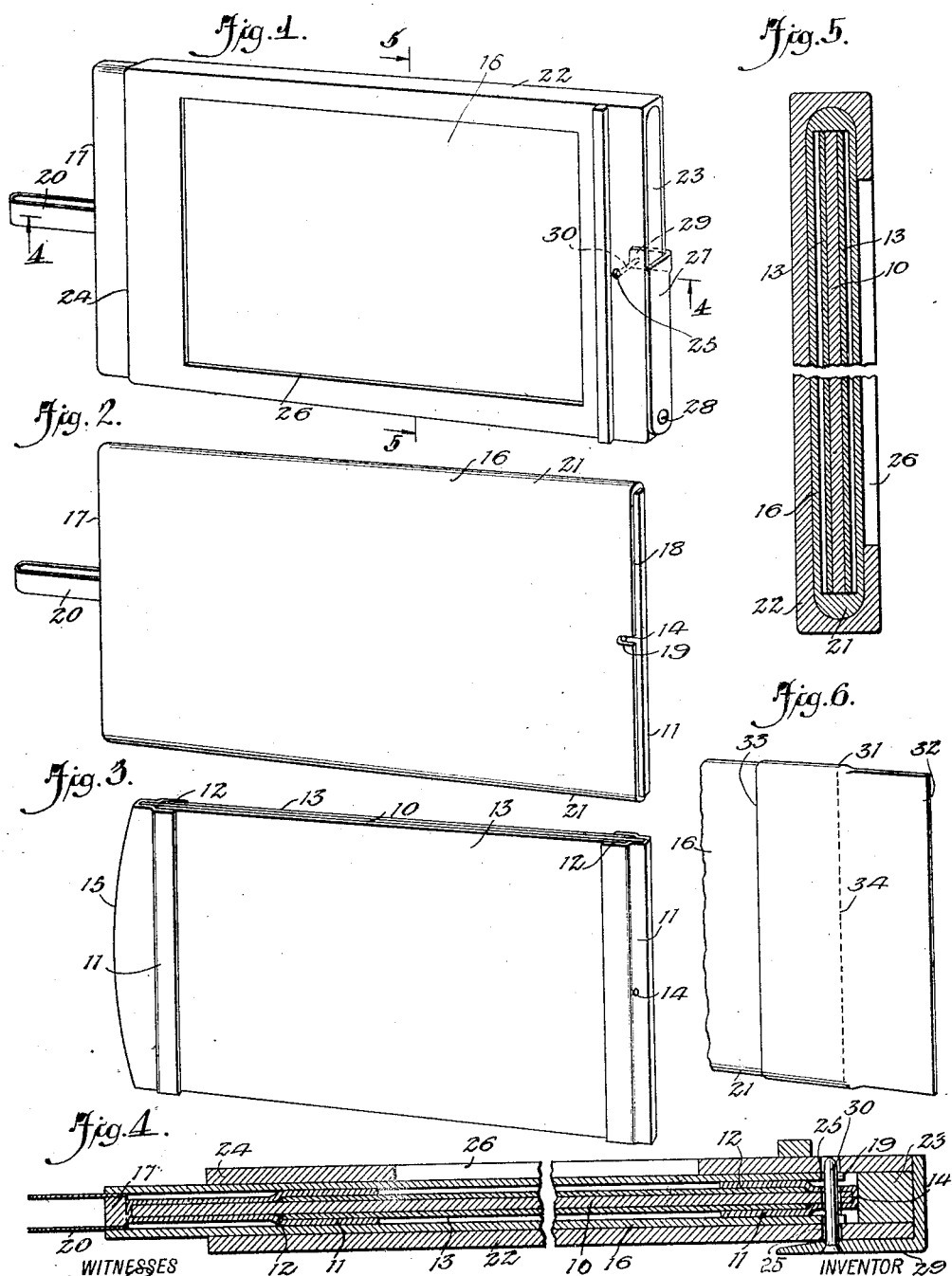
WITNESSES
INVENTOR
Emmet E. Whiting
BY
ATTORNEYS Patented Aug. 12, 1924.

1,505,000

UNITED STATES PATENT OFFICE.

EMMETT EDWIN WHITING, OF WABASHA, MINNESOTA.

FILM OR PLATE HOLDER.

Application filed May 13, 1922. Serial No. 560,689.

*To all whom it may concern:*

Be it known that I, EMMETT E. WHITING, a citizen of the United States, and a resident of Wabasha, in the county of Wabasha and State of Minnesota, have invented a new and Improved Film or Plate Holder, of which the following is a full, clear, and exact description.

This invention has relation to photography and refers more particularly to an improvement in film or plate holders for the purpose of exposing films or plates in a camera to the image.

As an object the invention contemplates a film or plate holder which embodies the features of compactness, simplicity, cheapness of construction, which is light in weight, and which is strong and durable.

As a further object the invention contemplates a film holder which differs from the common form of holders, in that it is composed of telescopic sections, thereby eliminating doors, curtains, slides, grooves and springs now commonly employed in the various types of film or plate holders.

As a further object the invention contemplates in a device of the character described a film holding section and covering section which may be so cheaply constructed that said sections may be discarded when once used.

As a further object the invention contemplates in connection with a film holder an improved seal for the film holding and covering sections which insures to the purchaser the receipt of an airtight film package free from dust and protected against light, fog, and dampness, gases, or other destructive agencies.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed.

In the drawings—

Figure 1 is a perspective view of the complete film holder in assembled condition.

Fig. 2 is a similar view of the film supporting and covering elements in assembled relation and removed from the carrier.

Fig. 3 is a similar view of the film supporting element removed from the covering element.

Fig. 4 is an enlarged longitudinal sectional view taken approximately on the line 4—4 of Fig. 1.

Fig. 5 is an enlarged transverse sectional view taken approximately on the line 5—5 of Fig. 1.

Fig. 6 is a fragmentary perspective view illustrating the seal.

Referring to the drawings by characters of reference, the film or plate holder embodies an inner carrier member 10 consisting of a rectangular strip of material such as cardboard or the like which has attached to its opposite ends transversely disposed strips 11, the inner edges of which are spaced from the member 10 to provide receiving grooves 12 for the reception of the opposite ends of the films or plates 13 whereby said films or plates are detachably associated with the carrier member. One extremity of the carrier member is perforated as at 14 and the opposite end is convex or arcuate as at 15, the purpose of which will be hereinafter set forth. The film or plate holder further includes an intermediate housing member 16 in the form of an envelope which is provided with a closed end 17 and an open end 18 for telescopically receiving the carrier member 10 whereby the films or plates 13 are housed and protected before and after they have been exposed. In telescopically associating the carrier and housing member, the convex or arcuate end 15 is inserted first and abuts with the closed end 17 to bring the aperture 14 in registration with the slots or notches 19 extending inwardly from the free open end 18 of the carrier member. The closed end 17 is further provided with a manipulating loop 20 the purpose of which will be hereafter set forth. The longitudinal side edges of the member 16 are preferably rounded as at 21. The film or plate holder further includes an outer supporting member or casing 22 having a closed end 23 and an open end 24 which is designed to telescopically receive and snugly accommodate the intermediate housing member 16, the same being inserted through the open end 24. In associating the member 16 with the member 22 the open end 18 of the housing member is inserted first and is adapted to abut with the closed end 23 of the outer member to bring the aperture 14 of the inner member and the slots or notches 19 of the housing member in registration with the aligned perforations 25 formed in the closed end of the outer member or case 22. The outer member or case 22 has one of its side walls cut away as at 26 to provide a window opening and said outer member or case may form a permanent part of the camera to constitute a camera back or may be constructed as a separate element adapted to be detachably associated with the camera back. A catch 27 is pivoted as at 28 to the rear closed end of the outer member or case 22 for lateral swinging movement and the free extremity of said catch is provided with a right angularly disposed arm 29 provided with an inwardly projecting retaining pin 30 which when the arm is swung to a position parallel to the rear closed end of the member 22, is designed to pass through the aligned openings 25, through the slots or notches 19 in the intermediate housing member 16 and the aperture 14 in the inner carrier member 10.

In use and operation of the invention, the cut films or plates 13 are associated with the opposite faces of the carrier member 10 as heretofore set forth and said carrier member together with the films or plates carried thereby are telescopically associated with the housing member 16. The photographer procures these members in any desired number which are ready for use in connection with a permanent or detachable camera back or case 22 of the type illustrated. When it is desired to expose the films or plates, the housing member 16 with the carrier member 10, or films and plates, is inserted in the open end 24 of the case or camera back 22 until the end or extremity 14 abuts with the closed end 23 of the case or camera back 22. In applying or associating the same with the case 22, the latch 27 is swung laterally to retract the retaining pin 30 from the openings 25 and after the members 10 and 16 have been introduced into the case the latch is thrown to latching position to cause the retaining pin to enter the notches or slots 19 and aperture 14. When this has been accomplished the case 22 if in the form of a detachable camera back is associated with the camera. The loop 20 is then employed to withdraw the housing member 16 from the case or camera back 22, during which withdrawing operation the retaining pin 30 functions to retain the inner carrier member 10 against accidental displacement or withdrawal from the camera back. The film or plate 13 disposed adjacent the side provided with the window opening 26 is thus supported and maintained in a position to be exposed when the camera shutter is manipulated. When the exposure is completed the intermediate housing member is again inserted, the latch 27 is swung to a release position and the member 16 is withdrawn together with the member 10. The members 16 and 10 are then reversed to bring the unexposed film 13 toward the side of the case or camera back having the window opening, said members being reinserted therein, the catch 27 being again swung to retaining position and the member 16 removed. When both films or plates have been exposed, the member 16 is again inserted, the retaining catch being swung to release position and the members 10 and 16 removed together for transportation or storage until the films or plates are developed. It will be noted that the convex or arcuate extremity 15 of the member 10 extends an appreciable distance beyond the open end 24 of the case or camera back 22 whereby to facilitate the insertion of the empty member 16 in the case or camera back when the member 10 is arranged therein. The members 10 and 16 are designed to be constructed of inexpensive material in order that the same may be used once and discarded if desired.

In order to seal the films within the housing 16 in an airtight condition to protect the same from dust, light, fog, dampness or other destructive agencies, a seal 31 may be employed as illustrated in Fig. 6, the same being constructed in the form of a short envelope having a closed end 32 and an open end 33 which is designed to be arranged over the open end of the housing 16 as illustrated in Fig. 6 up to the perforated or weakened line 34 thereof. When the photographer positions the films in the housing 16 the outer closed end beyond the perforations is torn off. After the films have been exposed the torn off end is used to cover the open end of the housing member 16.

I claim:

1. A film or plate holder comprising a member with which the films or plates are detachably associated, a light excluding envelope having one open end adapted to telescopically receive the carrier member, and a frame having one open end and a window opening in one side adapted to telescopically receive the envelope with the film carrier member arranged therein whereby the films or plates are positioned with respect to the window opening for exposing therethrough upon withdrawal of the envelope from the frame.

2. A film or plate holder comprising a member with which the films or plates are detachably associated, a light excluding envelope having one open end adapted to telescopically receive the carrier member, a frame having one open end and a window opening in one side adapted to telescopically receive the envelope with the film carrier member arranged therein whereby the films or plates are positioned with respect to the window opening for exposing therethrough upon withdrawal of the envelope from the frame, and interengageable means on the frame and film carrier member adapted to coact with each other for coupling the same to retain the carrier member within the frame when the envelope is withdrawn.

3. A film or plate holder comprising a member with which the films or plates are detachably associated, a light excluding envelope having one open end adapted to telescopically receive the carrier member, a frame having one open end and a window opening in one side adapted to telescopically receive the envelope with the film carrier member arranged therein whereby the films or plates are positioned with respect to the window opening for exposing therethrough upon withdrawal of the envelope from the frame, interengageable means on the frame and film carrier member adapted to coact with each other for coupling the same to retain the carrier member within the frame when the envelope is withdrawn, said means comprising an apertured portion in the film carrier member, and a swinging latch on the frame engageable in said apertured portion.

4. The combination with a frame having a closed end and an open end and provided with a window opening in one of its sides, of means for holding, protecting, introducing and removing films or plates thereto comprising a carrier member consisting of a strip of material, means for associating films or plates with the opposite sides of the carrier member, a light excluding and protecting envelope having a closed end and an open end within which the film carrier is telescopically received, said envelope adapted to be inserted, open end first, within the open end of the frame, and interengageable means carried by the frame and the film carrier for coupling the same to each other whereby to retain the film carrier within the frame when the envelope is withdrawn and whereby upon reinsertion of the envelope and disengagement of said means the film holder and films may be removed from the frame, the said interengageable means comprising an apertured portion in the film carrier, registering notched portions adjacent the open end of the envelope, registering apertured portions in the closed end of the frame, and swinging latch on the frame having a latch pin engageable in the registering apertured portions of the frame and carrier.

5. A film or plate holder embodying an inner member, means on said member for detachably associating films or plates with the opposite sides thereof, an intermediate open ended member adapted to telescopically receive the inner member for housing and protecting the films or plates carried thereby and the open ended outer member having a window opening in one of its sides adapted to telescopically receive the associated inner and intermediate members for positioning the films or plates with respect to the image to be photographed, whereby upon withdrawal of the intermediate member from the outer member, with the inner member remaining positioned within the outer member, exposure of the films or plates through the window opening thereof will be effected, and means carried by the outer member adapted to coact with the inner member for coupling the same together whereby to prevent displacement of the inner member and the films or plates upon withdrawal of the intermediate member.

6. A film or plate holder embodying an inner member, means on said member for detachably associating films or plates with the opposite sides thereof, an intermediate open ended member adapted to telescopically receive the inner member for housing and protecting the films or plates carried thereby and the open ended outer member having a window opening in one of its sides adapted to telescopically receive the associated inner and intermediate members for positioning the films or plates with respect to the image to be photographed, whereby upon withdrawal of the intermediate member from the outer member, with the inner member remaining positioned within the outer member, exposure of the films or plates through the window opening thereof will be effected, means carried by the outer member adapted to coact with the inner member for coupling the same together whereby to prevent displacement of the inner member and the films or plates upon withdrawal of the intermediate member, and a seal disposed over the open end of the intermediate member having a detachable portion constituting a means for resealing the intermediate member after the films or plates have been exposed.

EMMETT EDWIN WHITING.